358-86 SR
10/9/84 OR 4,476,488

United States Patent [19]
Merrell

[11] Patent Number: 4,476,488
[45] Date of Patent: Oct. 9, 1984

[54] CONTROL CIRCUIT FOR CATV ALERT SYSTEM

[75] Inventor: Richard G. Merrell, Hebron, Ill.

[73] Assignee: Zenith Electronics Corporation, Glenview, Ill.

[21] Appl. No.: 478,607

[22] Filed: Mar. 23, 1983

[51] Int. Cl.[3] .......... H04N 7/16; H04B 1/16

[52] U.S. Cl. .......... 358/86; 455/4; 455/228

[58] Field of Search .......... 358/86; 455/3, 4, 228

[56] References Cited

U.S. PATENT DOCUMENTS

| | | | |
|---|---|---|---|
| 3,122,705 | 2/1964 | Craig et al. | 455/228 |
| 3,701,024 | 10/1972 | Knowles et al. | 455/228 X |
| 3,886,538 | 5/1975 | Takeuchi | 340/310 |
| 3,975,583 | 8/1976 | Meadows | 358/86 X |
| 3,993,955 | 11/1976 | Bezcher et al. | 358/86 X |
| 3,996,578 | 12/1976 | Takeuchi et al. | 340/416 |
| 4,066,966 | 1/1978 | Takeuchi et al. | 325/308 |
| 4,075,628 | 2/1978 | Masuda et al. | 340/416 |
| 4,142,156 | 2/1979 | Freund | 455/4 |

FOREIGN PATENT DOCUMENTS

| | | | |
|---|---|---|---|
| 55-147048 | 11/1980 | Japan | 455/3 |

*Primary Examiner*—Keith E. George

[57] ABSTRACT

A circuit for controlling the operation of a cable television alarm device in accordance with an alert signal and an all-clear signal developed by a subscriber decoder in response to broadcast codes received over the cable network comprises a flip-flop responsive to the alert and all-clear signals for activating and de-activating the alarm device respectively and a manually operable single-pole switch for controlling the operation of the flip-flop. The switch is displaceable between first and second switching positions for enabling and disabling the flip-flop and is momentarily displaceable to the second switching position for clearing the flip-flop.

7 Claims, 3 Drawing Figures

CONTROL CIRCUIT FOR CATV ALERT SYSTEM

BACKGROUND OF THE INVENTION

The present invention relates generally to alarm apparatus for use in cable television (CATV) systems and particularly concerns an improved alarm control circuit for controlling an alarm apparatus operated in response to signals provided by a CATV decoder which receives alarm messages from a head-end facility over a CATV network.

Addressable CATV systems comprise head-end facilities which transmit television programming and data signals through a CATV network for receipt by special decoders installed for operating the television receivers of system subscribers. Typically, one or more tiers of programming signals are transmitted in encoded or scrambled form and must be properly decoded or unscrambled by a subscriber's decoder before being applied to the television receiver for reproduction. Numerous techniques for encoding the video portion of a transmitted television signal are well known in the art and include video signal polarity inversion and synchronization signal suppression. Each subscriber's decoder is authorized for decoding selected tiers or categories of programming signals according to the payment of prescribed fees, the decode authorization status of the decoder being automatically effected by data messages transmitted from the head-end facility to the decoder through the CATV network. These data messages may be encoded in the transmitted television signal itself; for example, the data may be inserted as logic bits in the vertical intervals of the broadcast television signal, or they may be transmitted on an out-of-band carrier. In either event, it will be appreciated that the data messages provide a convenient facility for transmitting information such as decoder authorization status from the head-end facility to the system subscribers via the CATV network.

It has recently been proposed to utilize this communications facility for providing a wide variety of information from the CATV head-end to the system subscribers. It has in particular been proposed to transmit emergency and other alert messages which can be processed by a subscriber's decoder for activating an alarm or other indicator to alert the subscriber of some condition. The alert condition could be of general interest to the entire subscriber population, e.g. a severe weather warning, in which case all of the subscribers would be alerted. Alternatively, the alert could be of a more narrowly defined nature such as an alert directed to the volunter firemen in the community. In any case, there is currently a need in an addressable CATV alert system of this general type for an improved subscriber operable apparatus for controlling alarm generation and, specifically, there is a need for an inexpensive subscriber control circuit which is convenient to use and which will provide for full subscriber control over the generation and override or cancelling of an alarm indication.

It is therefore a general object of the present invention to provide an improved subscriber operable control circuit for an addressable CATV emergency/alert system.

It is a more specific object of the invention to provide an improved subscriber operable alarm control circuit for an addressable CATV emergency/alert system in which one single-pole switch is displaceable between two switching positions for enabling, disabling, and clearing an alarm generating circuit.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the several Figures and in which:

DESCRIPTION OF THE PREFERRED EMBODIMENT

The alarm control circuit of the present invention is adapted for use in an addressable CATV system of the type in which data messages are transmitted from a head-end facility through a cable network for controlling the operation of multiple subscriber decoder units. The decoder units, under head-end control, selectively decode or unscramble television signals which are also transmitted through the cable network. The alarm control circuit of the invention provides a novel facility for controlling an alarm apparatus which is responsive to alarm or alert messages transmitted through such an addressable CATV system.

Figure 1:
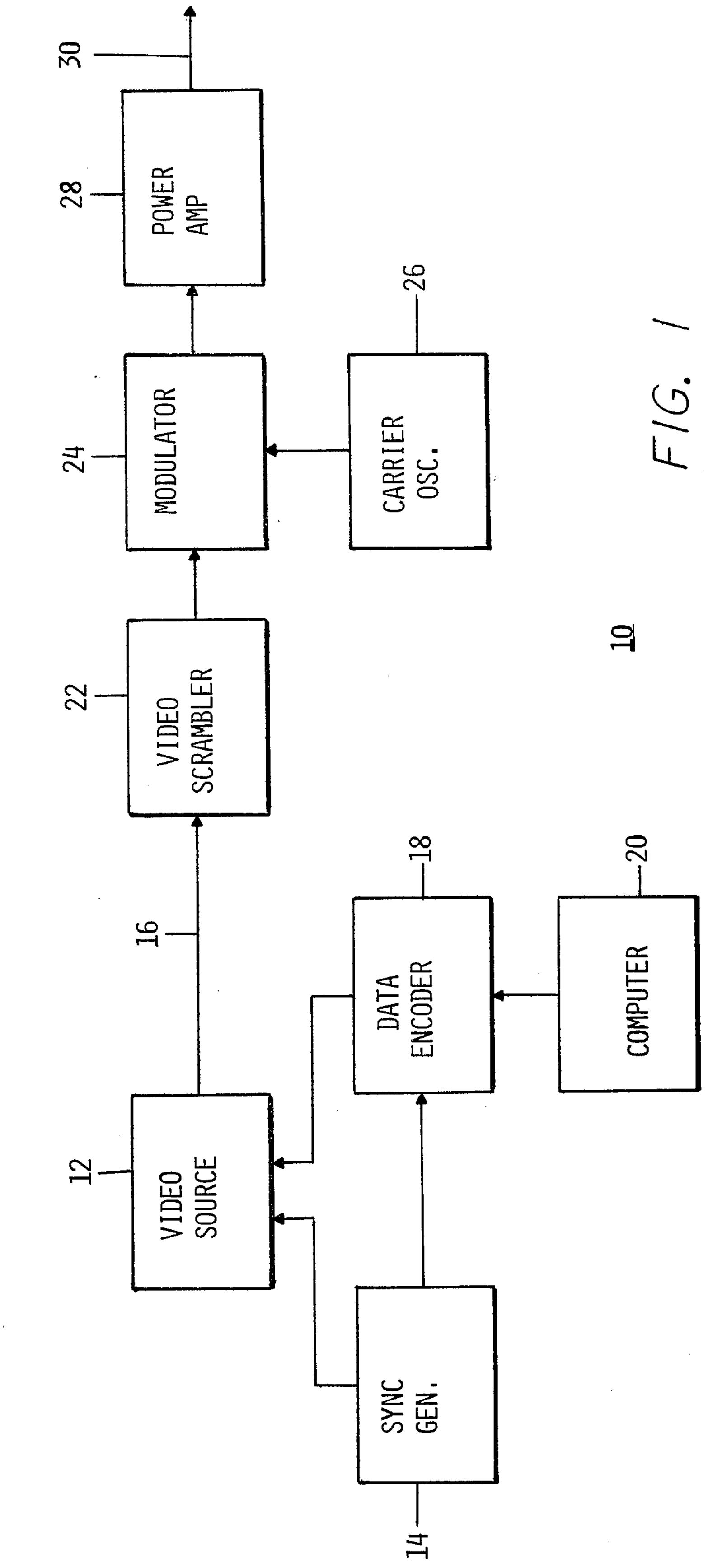
FIG. 1 is a block diagram of an exemplary embodiment of a CATV head-end encoder for generating television programming signals and data messages adapted for transmission through a CATV network.

Co-pending application Ser. No. 322,481, filed Nov. 18, 1981 and assigned to the assignee of the present invention, discloses an exemplary addressable CATV system of the foregoing type. Referring to FIG. 1, this system includes a head-end facility 10 comprising a video signal source 12 responsive to a sync generator 14 for developing a composite baseband video signal on an output conductor 16. Video source 12 also receives an input from a data encoder 18 which develops an appropriately band-limited digitally encoded serial data signal for insertion into one or more horizontal lines of the vertical blanking intervals of the composite baseband video signal developed on conductor 16. The digitally encoded signals, which are typically generated by data encoder 18 in response to data supplied by a digital computer 20, normally include subscriber address and authrization codes for facilitating head-end control of subscriber decode authorization status and program codes which identify the program categories or tiers of the accompanying CATV signal.

For example, one or more selected horizontal scanning lines of the vertical intervals of the composite baseband video signal developed on conductor 16 may be used to transmit 26 bits of information, the first 20 bits of the selected line being reserved for the transmission of subscriber address codes which uniquely identify each system subscriber and his decoder unit. The following five bits of the selected horizontal line may be used to transmit a subscriber authorization code followed by a single parity bit. The subscriber authorization code, as will be explained in further detail hereinafter, is used to selectively set the decode authorization status of the subscriber decoder identified by the address code transmitted during the same horizontal line. The program code may be transmitted on another horizontal line of the vertical interval and, as previously indicated, identifies the program categories or tiers to which the accompanying CATV signal belongs.

In addition to the foregoing, emergency/alert data for operating a subscriber alarm apparatus may similarly be encoded in selected horizontal lines of the vertical intervals of the composite baseband video signal. As will be explained in further detail hereinafter, this data, which may be directed to the entire subscriber population base or to selected groups of subscribers, is appropriately encoded for activating and clearing an alarm apparatus provided at the respective subscriber locations.

Returning to FIG. 1, the composite baseband video signal developed on conductor 16, together with the data encoded in the vertical intervals thereof, is applied to a video scrambler 22. Video scrambler 22 may employ any of a number of well known techniques for scrambling the video content of the baseband signal on conductor 16. The scrambled and encoded baseband video signal is then coupled from video scrambler 22 to a modulator 24 for amplitude modulating an RF carrier signal developed by an oscillator 26, the resulting amplitude modulated signal being amplified by a power amplifier 28 for transmission through a cable network 30.

Figure 2:
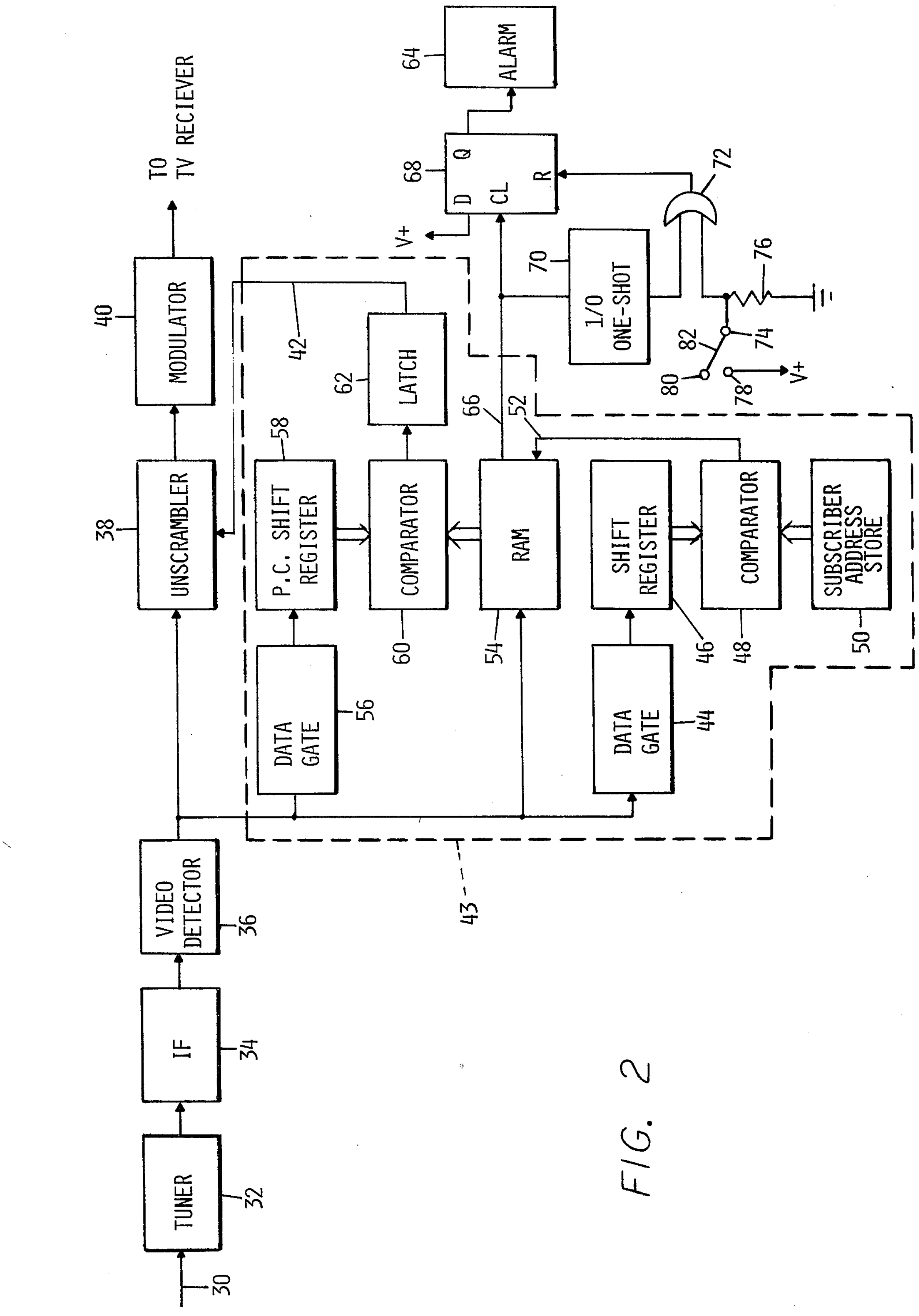
FIG. 2 is a block diagram of a subscriber CATV decoder including an alarm message detection circuit and one embodiment of the subscriber operable alarm control circuit of the invention.

FIG. 2 illustrates a subscriber decoder and alarm apparatus which is operable in response to signals transmitted from head-end facility 10 through cable network 30 and which includes a first embodiment of the alarm control circuit of the present invention. The decoder includes a conventional tuner 32 which converts the RF CATV signal received over cable network 30 to an intermediate frequency signal which is coupled through an intermediate frequency amplifier 34 to the input of a video detector 36. The output of video detector 36 comprises a composite baseband video signal corresponding to the baseband signal developed at the output of video scrambler 22 at the head-end facility shown in FIG. 1. This scrambled baseband video signal is processed by a video unscrambler 38, amplitude modulated on a standard RF television carrier (typically a channel 3 or channel 4 carrier) by a modulator 40 and coupled therefrom to the antenna terminals of the subscriber's television receiver for vewing. Video unscrambler 38 is selectively enabled in response to a decode authorization signal developed on an output conductor 42 of a data processing circuit 43. When enabled, video unscrambler 38 is effective for reversing the scrambling process so that an unscrambled composite baseband video signal is developed at its output enabling viewing of the received television signal by the subscriber. Otherwise the video signal will be applied to the subscriber's receiver in a scrambled and thereby unviewable form.

The output of video detector 36 is also applied to a first data gate 44 of data processing circuit 43, data gate 44 being operable for coupling each transmitted subscriber address code for storage in a shift register 46. Each multibit subscriber address code stored in shift register 46 is applied to one port of a comparator 48 for comparison with the subscriber's individual address code which is stored in a register 50. When comparator 48 detects a match between a transmitted address code and the subscriber's stored address code a control signal is developed on an output conductor 52 for setting or updating the contents of a subscriber authorization RAM 54 with the following subscriber authorization code. In this manner, the head-end facility may selectively update the contents of the authorization RAM 54 of each individual system subscriber. In addition, a selected bit of the authorization code stored in RAM 54, hereinafter referred to as the alert bit, may be selectively set or reset to communicate an alert or all clear condition to the subscriber. That is, an alert condition may be indicated by addressing RAM 54 of the subscriber's decoder for setting the alert bit and an all-clear condition may be indicated by addressing the RAM for resetting the alert bit.

The output of video detector 36 is also coupled to a second data gate 56 of data processing circuit 43, data gate 56 being operable for coupling the program codes encoded in the vertical intervals of the baseband video signal for storage in a program code shift register 58. The program code stored in shift register 58 is applied to one input port of a second comparator 60 for comparison with the subscriber's decode authorization status as reflected by the subscriber authorization code stored in RAM 54. When a proper matching condition is detected by comparator 60, indicating that the subscriber is authorized to decode the received program, the comparator sets a latch 62 which then couples an enabling signal over conductor 42 to unscrambler 38.

The alert bit stored in RAM 54 is coupled by the control circuit of the invention to an alarm or indicator apparatus 64. It will be recalled that each system subscriber may be individually addressed for alerting him to a particular condition by setting the alert bit of RAM 54 and that the alert may similarly be cancelled by resetting the alert bit. To this end, the alert bit stored in RAM 54 is coupled by a conductor 66 to the clock input of a D-type flip-flop 68 and also to the input of a negative-edge triggered monostable multivibrator 70. The D input of flip-flop 68 is connected to a source of positive potential V+ (defined as representing logic 1) and the output of monostable 70 is applied via an OR-gate 72 to the reset input of the flip-flop. The Q output of flip-flop 68 is coupled for controlling the alarm or indicator 64.

The control circuit further includes a manually operable switching device comprising a first terminal 74 connected to a second input of OR-gate 72 and through a resistor 76 to ground potential, a second terminal 78 connected to a source of positive potential V+ and a third terminal 80. As will be explained in further detail below, a single-pole switching element 82 is displaceable between two switching positions for connecting terminal 74 to either terminal 78 or to terminal 80 to enable, disable or clear control flip-flop 68.

More specifically, since the output of monostable 70 is normally logically low, operating switching element 82 for interconnecting terminals 74 and 80 as shown effectively applies a signal at ground potential through OR-gate 72 to the reset input of flip-flop 68 thereby enabling the flip-flop. When enabled, flip-flop 68 is responsive to the zero-one transition occurring at its clock input when the alert bit is set for assuming a logic 1 state resulting in activation of alarm 64. When the alert bit is subsequently reset by the head-end, the resulting one-zero transition on conductor 66 triggers monostable 70 whereby a pulse is coupled through OR-gate 72 resetting flip-flop 68 to its logic 0 state and thereby de-activating alarm 64. Operating switching element 82 for interconnecting terminals 74 and 78 results in the application of a positive potential signal to the reset input of flip-flop 68 thereby disabling the flip-flop by causing it to assume and maintain a logic 0 state. When so disabled by a subscriber, flip-flop 68 and thereby alarm 64 are both totally unresponsive to the alert bit. It will be appreciated that a subscriber may wish to disable the alarm when, for example, he plans to be away from home for some period of time.

The control circuit of the invention is further operable in a third mode enabling a subscriber to manually cancel an alarm once it has been sounded in response to the alert bit being set by the head-end. In particular, switching element 82 may be momentarily displaced to its position interconnecting terminals 74 and 78 for developing a positive-going pulse which is applied from terminal 74 for resetting flip-flop 68 and de-activating alarm 64. Since the switching element is thereafter returned to its alarm enabling position, the effect of the foregoing momentary operation is to clear a sounded alarm and to re-condition the circuit for response to any subsequently transmitted alert messages. It will therefore be appreciated that there is provided a subscriber operable alarm control circuit for an addressable CATV emergency alert system in which one single-pole switch is operable by a subscriber for enabling, disabling or clearing an alarm generating circuit.

Figure 3:
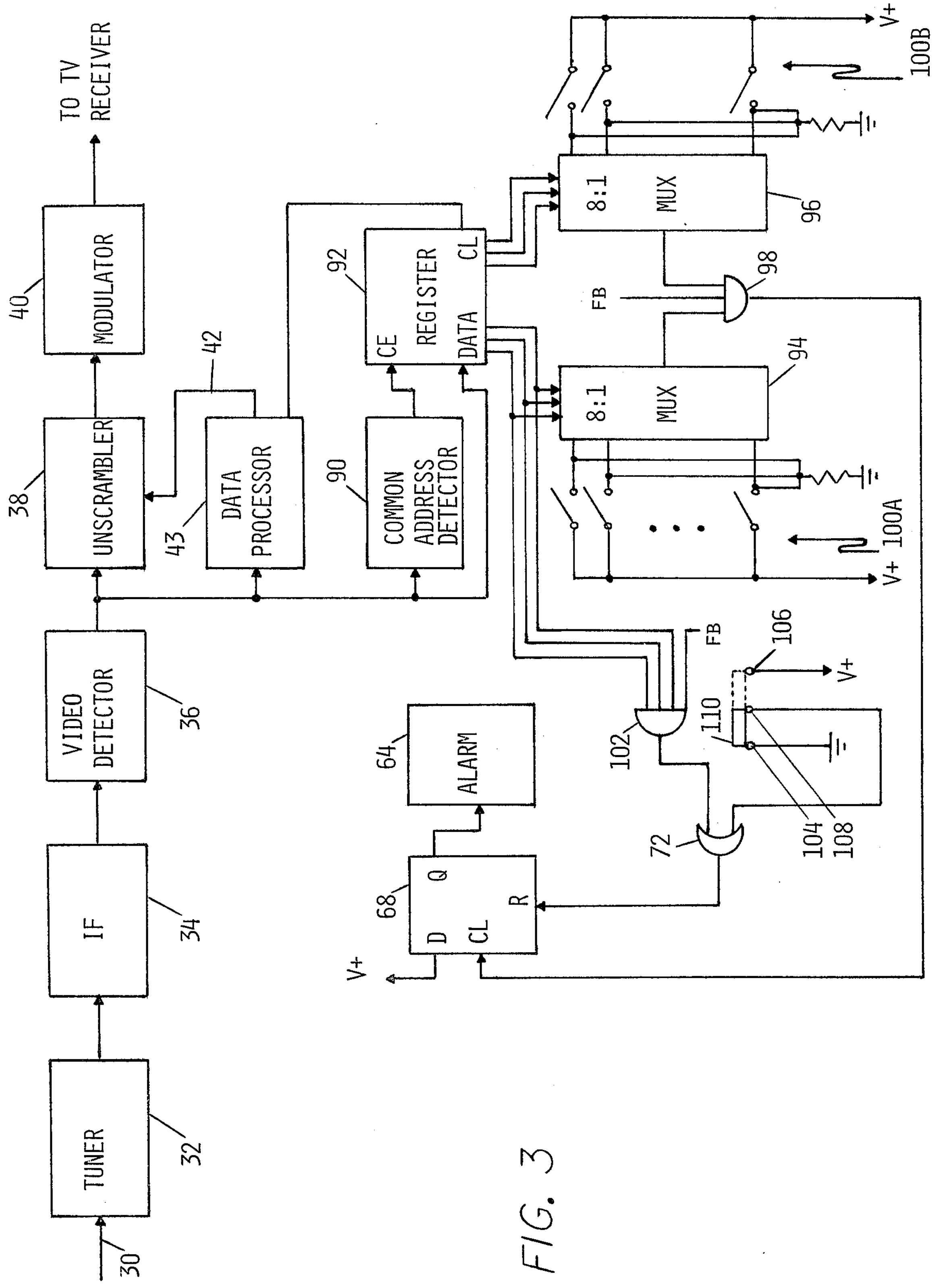
FIG. 3 is a block diagram of a subscriber CATV decoder including an alternate alarm message detection circuit and a second embodiment of the subscriber operable alarm control circuit of the invention.

FIG. 3 illustrates a subscriber decoder having an alternate alarm message detection circuit and an alternate alarm control circuit. In this system, head-end control of alarm 64 is achieved by inserting a predetermined common address code on an unused horizontal line of the vertical interval of the broadcast signal followed by a six bit alert message. In a preferred format, three bits of the six bit alert message, referred to herein as the category code, are used to identify a selected portion of the subscriber population by category (e.g. volunteer firemen, police, etc.) while the remaining three bits of the message, referred to herein as the geographic area code, are used to identify a selected portion of the subscriber population by geographic area. It is therefore possible with this format to address or alert, for example, only the volunteer firemen residing in a selected geographic section of the community or any other category of subscribers within a given geographic section of the community. Each subscriber's decoder includes an identical common address detector 90 connected to the ouptut of video detector 36 which is designed for detecting the receipt by the decoder of the common address code. Upon detection of the common address code, detector 90 enables a six bit register 92 which is clocked only during the vertical intervals of the received CATV signal for storing the following six bit alert message comprising the category and geographic arera codes.

The stored three bit category code is coupled to a first 8 to 1 multiplexer 94 and the stored three bit geographic area code is coupled to a second 8 to 1 multiplexer 96, the outputs of multiplexers 94 and 96 being applied to the inputs of an AND-gate 98. A flyback pulse is applied to another input of gate 98 to prevent erroneous responses due to spurious input signals. Each of the multiplexers 94 and 96 includes a respective set of eight programming switches 100A and 100B which may be selectively operated for programming the respective multiplexer for developing a logic 1 output only in response to selected three bit input patterns. Thus, if the stored category and geographic area codes forming the received six bit alert message both correspond to the programmed states of switches 100A and 100B, representing that the subscriber belongs to both the addressed subscriber category and geographic area, an alert signal will be developed at the output of gate 98 in time coincidence with the flyback pulse for clocking flip-flop 68 and thereby activating alarm 64. The three bit category code coupled to multiplexer 94 is also used to form an all-clear signal. When the three bits of the category code are all logically high, an AND-gate 102, which is also enabled by the flyback pulse to prevent erroneous responses due to spurious signals, will develop a clear signal pulse which is coupled to the reset input of flip-flop 68 for de-activating alarm 64.

The switching control circuit of FIG. 3 is similar to that of FIG. 2 except that in this case a single-pole slide switch is used. The switching circuit includes three terminals, a first terminal 104 being connected to ground potential, a second terminal 106 being connected to a source of positive potential V+ and a third terminal 108 being connected to one input of OR-gate 72. A single-pole switching element 110 is slidably displaceable between a first position (shown in solid line) interconnecting terminals 104 and 108 for enabling flip-flop 68 and alarm 64 and a second position (shown in dotted line) for disabling the flip-flop and alarm all as previously described. Moreover, switching element 110 is momentarily displaceable from the first position to the second position and back to the first position for enabling manual clearing of the flip-flop and alarm. It will thus be appreciated that the switching circuit of FIG. 3 functions substantially identically to and achieves substantially the same desirable results as the switching circuit of FIG. 2.

While particular embodiments of the invention have been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. A circuit for controlling the operation of a cable television alarm device in accordance with an alert signal and an all-clear signal developed by subscriber apparatus in response to broadcast data received over the cable television network, comprising:

bi-stable means having a first input responsive to the alert signal for assuming a first state for activating the alarm device and a second input responsive to the all-clear signal for assuming a second complementary state for de-activating the alarm device; and manually operable single-pole switch means coupled to the second input of the bi-stable means, said switch means being displaceable between a first position for coupling a first reference potential to the second input of the bi-stable means for enabling the bi-stable means to assume its first or second state in response to an alert or an all-clear signal respectively and a second position for coupling a second reference potential to the second input of the bi-stable means for causing the bi-stable means to assume and maintain its second state, said switch means being further operable for momentary displacement to its second position for coupling the second reference potential to the second input of the bi-stable means for causing the bi-stable means to assume its second state, whereby the switch means is manually displaceable between two switching positions for enabling, disabling and clearing the alarm device.

2. A control circuit according to claim 1 wherein said switch means comprises first, second and third switching terminals, the first and second terminals being coupled to sources of said first and second reference potentials respectively and the third terminal being coupled to the second input of said bi-stable means, and further comprising a single-pole switching element manually operable for selectively connecting the first and third terminals or the second and third terminals.

3. A control circuit according to claim 2 wherein said switch means further comprises an OR-gate for coupling said third switching terminal and said all-clear signal to the second input of said bi-stable means.

4. A control circuit according to claim 3 wherein said bi-stable means comprises a D-type flip-flop having a clock input terminal for receiving said alert signal, a D input terminal connected to a source of positive potential, a reset terminal connected to the output of said OR-gate and an output terminal coupled to said alarm device.

5. A control circuit according to claim 1 wherein said switch means comprises a first switching terminal coupled to the second input of the bi-stable means and resistively coupled to a source of ground potential comprising said first reference potential, a second switching terminal coupled to a source of positive potential comprising said second reference potential and a third switching terminal, said switch means further comprising a single-pole swithcing element manually operable for selectively connecting the first and second terminals or the first and third terminals.

6. A control circuit according to claim 5 wherein said switch means further comprises an OR-gate for coupling said first switching terminal and said all-clear signal to the second input of said bi-stable means.

7. A control circuit according to claim 6 wherein said bi-stable means comprises a D-type flip-flop having a clock input terminal for receiving said alert signal, a D input terminal connected to a source of positive potential, a reset terminal connected to the ouptut of said OR-gate and an output terminal coupled to said alarm device.

* * * * *